UNITED STATES PATENT OFFICE.

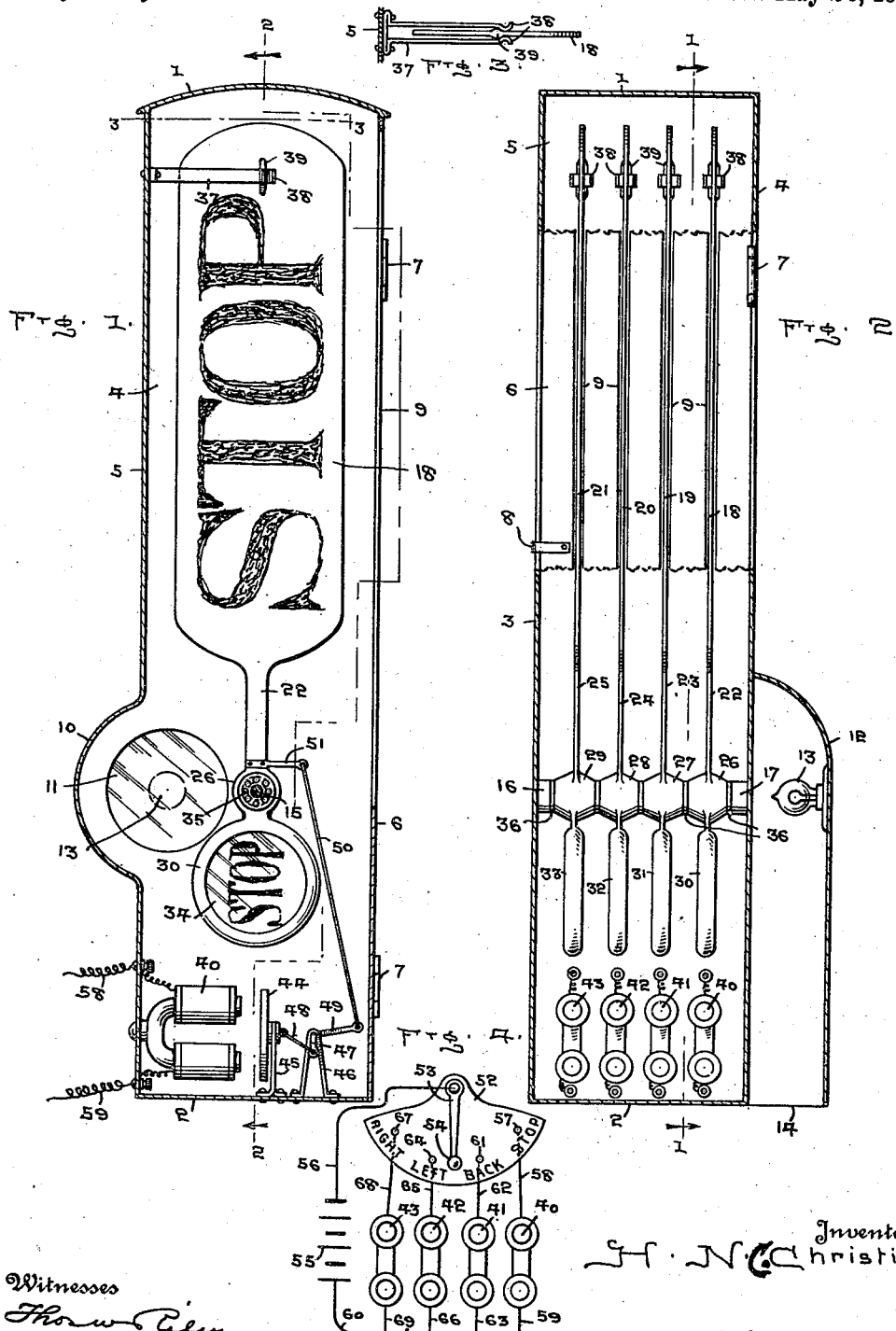

HAROLD N. C. CHRISTIE, OF POINT PLEASANT, NEW JERSEY.

SAFETY SIGNALING.

1,227,387.

Specification of Letters Patent.

Patented May 22, 1917.

Application filed November 9, 1915. Serial No. 60,594.

*To all whom it may concern:*

Be it known that I, HAROLD N. C. CHRISTIE, a citizen of the United States, residing at Point Pleasant, in the county of Ocean and State of New Jersey, have invented certain new and useful Improvements in Safety Signaling; and I do hereby declare the following to be a full, clear, and exact description of the invention, such as will enable others skilled in the art to which it appertains to make and use the same.

This invention relates to safety signaling and is more particularly adapted for use upon vehicles such as automobiles and the like.

One of the objects of this invention is the provision of a safety signaling device adapted to be positioned at the rear of an automobile or other vehicle, and operated from the driver's seat, for indicating to the driver of a vehicle approaching from the rear whether the vehicle ahead contemplates turning to the right or left, or whether the same will stop or back.

Another object of this invention is the provision of a safety signaling device for vehicles, provided with means for effectively indicating the contemplated movement of the vehicle at both day and night.

Another object of this invention is the provision of a safety signaling device having a plurality of signals for indicating the various movements of the vehicle by day or by night, and provided with means for electrically operating the signals from the driver's seat independently of each other at the will of the driver.

Another object of this invention is the provision of means for retaining the signals against movement when not in use.

Another object of this invention resides in the provision of means for displaying the signals at night, and at the same time reflecting light upon the license card of the automobile or other vehicle.

Another object of this invention is the provision of a casing for snugly housing the signals and their operating parts to protect the same against dust, dirt etc., and the provision of a closure for said casing whereby to gain access to the interior of the casing, the closure being provided with means through which the day signals project to the exterior of the casing when operated.

Other objects and advantages of this invention will be hereinafter more clearly set forth in the following specification, the subject-matter of the claims, and the views illustrated in the accompanying drawings, in which, Figure 1 is a vertical sectional view of the invention on line 1—1 of Fig. 2 looking in the direction of the arrows.

Fig. 2 is a vertical sectional view on line 2—2 of Fig. 1 looking in the direction of the arrows.

Fig. 3 is a top view on line 3—3 of Fig. 1, partly in section, showing the means for maintaining the signals against movement when not in use.

Fig. 4 is a diagrammatic view of the means for actuating the signals.

Referring to the drawings the casing or housing consists of the top 1, the bottom 2, the front wall 3, the rear wall 4, the side wall 5, and the door 6, constituting the other side wall, and hingedly connected to the rear wall 4 by the hinges 7, the door being retained in closed position by a suitable latch 8, and provided with the plurality of slots 9.

The rear wall 4, the front wall 3, and the side wall 5 are so formed at points remote from the bottom 2 of the casing so as to provide the offset 10, and secured in the rear wall 4 at the offset is the pane of red glass 11, and also secured in the front wall 3 at the offset and immediately opposite the red glass 11 is a similar glass, not shown.

Upon the lower portion of the rear wall 4 of the casing is the casing or lamp box 12, in which is secured the electric light 13, though any other lighting means may be employed. The light 13 is so positioned within the lamp box 12 that the light 13 is immediately opposite the red panes of glass 11 for providing the danger signal at night. The lamp box 12 is closed upon all sides excepting the bottom, which is open, as at 14, so that the light from the lamp 13 can shine downwardly upon the license card carried upon the vehicle so that the number of the vehicle may be clearly seen at night.

Disposed within the casing and extending from the front wall 3 to the rear wall 4 is the horizontal shaft 15, having its ends mounted in the bearing 16 upon the front wall 3 and the bearing 17 upon the rear wall 4.

Rotatably mounted upon the shaft 15 between the bearings 16 and 17 are a plurality of paddles or semaphores. Each of the semaphores are similarly constructed, mounted, and operated and consists of the respective paddles 18, 19, 20 and 21; the respective shanks 22, 23, 24 and 25; the respective hubs 26, 27, 28 and 29; the respective glass frames 30, 31, 32 and 33, in which frames are mounted a pane of glass as shown at 34 in Fig. 1, the other three panes of glass not being shown. The hubs 26, 27, 28 and 29 of the semaphores are rotatably mounted upon the shaft 15, and each of the hubs are provided with the ball bearings as shown at 35 in Fig. 1, the respective hubs having interposed therebetween, and the bearings 16 and 17, the washers 36. The respective semaphores are so constructed that the glass frames and the glass below the shaft 15 is slightly heavier than the paddle portions so that the semaphores will assume a vertical position within the housing when not in use, and for maintaining the paddles of the semaphores in steady position when not in use, the plurality of double spring keepers 37 are provided. These keepers are secured upon the inner side of the side wall 5, one opposite each paddle and are adapted to have their inwardly curved ends 38 adapted to engage the ribs or knobs 39 formed on each side of the paddles, as clearly shown in Fig. 3.

Secured upon the inner side of the side wall 5 are the plurality of magnets 40, 41, 42 and 43, a magnet for each semaphore. Opposite each of the magnets is an armature 44 mounted upon the upper end of a spring support 45 secured upon the bottom 2 of the housing, and also secured upon the bottom 2 of the housing is a bracket 46, in the upper end of which is rotatably mounted a substantial bell crank lever, the short arm 47 of which is connected to the armature by the short link 48, the longer arm 49 of the bell crank lever having connected thereto one end of the rod 50, the opposite end of the rod 50 being connected to an arm 51, secured upon the shank of a semaphore, as clearly shown in Fig. 1, it being understood, of course, that there is a duplication of this structure for each of the semaphores.

The manner of electrically operating the respective semaphores can be more readily understood by referring to Fig. 4 of the drawings. The plate 52, shown therein, is positioned at a point upon the vehicle within easy reach of the driver or operator, preferably upon the dash board of the vehicle, and pivotally mounted upon the plate 52 is the lever 53 provided with the handle 54. The pivoted end of the lever 53 is connected to the battery 55, or other suitable source of electricity, by the wire 56. Upon the plate 52 are a plurality of contacts, the contact 57 designated "Stop" is connected by the wire 58 to the magnet 40, which is connected by the wire 59 to the return wire 60. The contact 61 designated "Back" is connected by the wire 62 to the magnet 41 which is connected by the wire 63 to the return wire 60. The contact 64 designated "Left" is connected by the wire 65 to the magnet 42 which is connected by the wire 66 to the return wire 60. The contact 67 designated "Right" is connected by the wire 68 to the magnet 43 which is connected by the wire 69 to the return wire 60 leading back to the source of electricity.

The paddles and the glass panes of each of the semaphores are suitably supplied with the word corresponding to the word at the contact upon the plate 52 to which the respective semaphore is electrically connected, for example, the rearmost semaphore which is actuated by the magnet 40, as shown in Fig. 1, and which magnet 40 is connected to the contact 57 designated "Stop" upon the plate 52, has the word "Stop" suitably applied to the paddle 18 and the glass pane 34 thereof; and likewise the successive semaphores actuated by the magnets 41, 42 and 43, have their paddles 19, 20 and 21, and the panes of glass in their frames 31, 32 and 33 suitably supplied respectively with the words "Back," "Left," and "Right" corresponding to the respective contacts designated "Back," "Left" and "Right" through which these semaphores are actuated.

The operation of the device is briefly described as follows:—

Assuming that the vehicle is traveling forwardly and it is desirous to stop, the operator or driver of the machine or vehicle moves the lever 53 in a manner for placing the same upon the contact 57 designated "Stop," the magnet 40 is thereby energized upon the closing of the circuit and thereby attracts the armature 44 in the direction thereof; this movement of the armature 44 being made possible by its resilient mounting upon the spring support 45. This movement of the armature 44 carries with it the link 48, which is connected to the short arm 47 of the bell crank lever thereby rocking the bell crank lever in its support 46. This rocking action of the bell crank lever causes its longer arm 49 to be forced downwardly, which movement of the arm 49 draws downwardly the rod 50 and the arm 51 secured upon the shank 22 of the semaphore designated "Stop." By this action the semaphore will be released from its engagement with the retaining spring keeper 37 and moved from its vertical position to a horizontal position, the paddle 18 passing through the slot 9 in the door 6 opposite the paddle 18. When the semaphore assumes its horizontal position the word "Stop" is displayed exteriorly of the casing or housing and gives warning to an approaching vehicle from the rear that the machine or vehicle in front intends to stop, the paddle 18 giving the signal in the day time. At the same time that this semaphore assumes its horizontal position the glass 34 in the frame 30 is positioned in registration with the panes 11 in the housing and the light 13 therebehind, and in this instance, the word "Stop" upon the glass 34 is displayed at night and gives warning to an approaching vehicle or machine from the rear that the machine or vehicle in front intends to stop. Should the vehicle or machine be at a standstill and it is desirous to back, or should the vehicle be traveling in a forward direction and it is desirous to turn either to the right or to the left, all that is necessary for the operator or the driver of the vehicle or machine to do is to move the lever 53 upon the contact 61 designated "Back," or the contact 64 designated "Left," or the contact 67 designated "Right" whereby either of the magnets 41, 42 or 43 may be energized as desired for operating the corresponding semaphore for indicating to drivers or operators of other vehicles or machines approaching from the rear the intention of the driver or the operator of the vehicle or machine which is in front.

Having described my invention, what I claim as new and desire to secure by Letters-Patent, is:—

1. A signaling device for vehicles, comprising a housing, translucent members upon said housing, a casing upon said housing, illuminating means within said casing in registration with said translucent members, a plurality of signaling devices rotatably mounted within said housing, clasps within said housing for engaging said signaling devices for normally retaining the same in vertical position within said housing, and means for actuating said signaling devices for releasing the same from said clasps for displaying said signaling devices.

2. A signaling device for vehicles, comprising a housing, translucent members arranged within said housing, a plurality of signaling devices rotatably mounted within said housing each comprising an opaque body and a translucent body, means for actuating said signaling devices for positioning said opaque body thereof exterior of said housing and said translucent body thereof in registration with said translucent members, a casing upon one side of said housing and provided with an open bottom, and illuminating means within said casing for projecting rays of light through said translucent members of said housing and said translucent members of said signaling devices and simultaneously projecting rays of light through the open bottom of said casing upon the license tag of the vehicle.

3. A signaling device for vehicles, comprising a housing, translucent members arranged in said housing, a plurality of transversely alined signaling devices pivotally mounted within said housing, each of said signaling devices comprising an opaque body at one side of its pivotal point and having designating characters thereon, and a frame at the opposite side of its pivotal point and provided with a translucent member therein having designating characters thereon, said frame and translucent member being heavier than said opaque body for returning said signaling devices to inoperative position within said housing, a plurality of electromagnets and armatures within said housing, connections between said armatures and said signaling devices for operatively displaying said signaling devices upon the energization of said magnets, and retractile spring supports for said armatures for aiding the translucent members to return said signaling devices to normal inoperative position upon the deënergization of said magnets.

In testimony whereof I have signed my name to this specification in the presence of two subscribing witnesses.

HAROLD N. C. CHRISTIE.

Witnesses:
 GLADYS DUANE,
 FRED C. HAVENS.